Feb. 15, 1966 F. MEADOWCROFT 3,235,286
RESILIENT LINK FOR AGRICULTURAL IMPLEMENTS
Filed Feb. 11, 1963
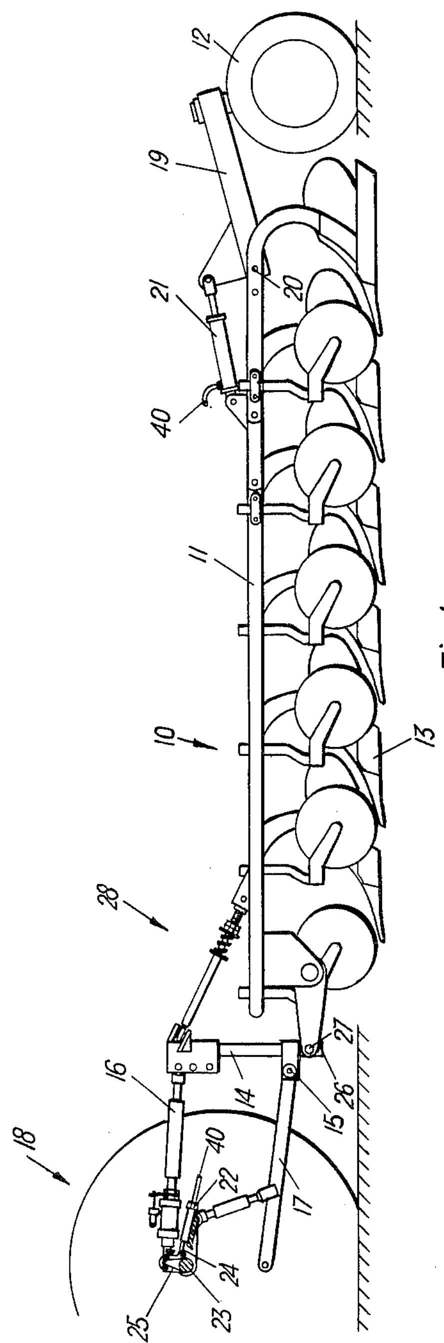
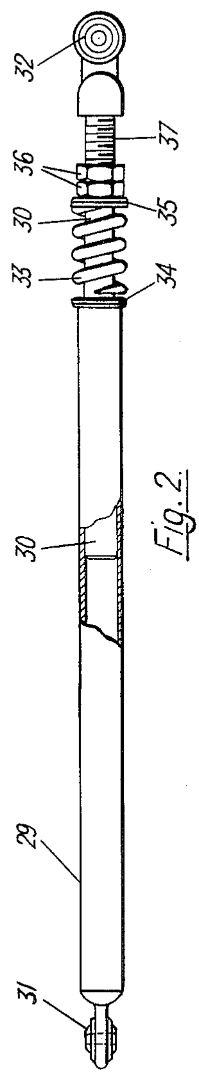
*Inventor*
FRED MEADOWCROFT
*By* Norris & Bateman
*Attorney*

United States Patent Office 3,235,286 Patented Feb. 15, 1966

3,235,286

RESILIENT LINK FOR AGRICULTURAL IMPLEMENTS

Fred Meadowcroft, Bridlington, England, assignor to David Brown Tractors Limited Filed Feb. 11, 1963, Ser. No. 257,526
4 Claims. (Cl. 280—489)

The invention relates to trailer vehicles, to fully trailed agricultural implements, and to semi-trailed agricultural implements.

The expression "semi-trailed implement" is herein intended to denote an implement the front end of which is adapted to be connected to power lift means on a tractor and the rear end of which is always supported by ground-engaging means such as a wheel. This type of implement is also known as a "semi-mounted" implement.

The draft force required to be exerted by a tractor on an implement or trailer produces a turning moment about the point of contact of the rear wheels of the tractor and the ground. If the draft force becomes excessive, the turning moment causes the front wheels of the tractor to lift from the ground.

Considering first a fully mounted implement, for example an implement mounted directly on a tractor three-link hitch, the implement is not freely pivotable relative to the tractor about a transverse axis, and if the draft force exerted by the tractor on the implement becomes excessive for any reason the tendency to leave the ground is resisted by the upper hitch link. If the three-link hitch is actuated by a draft responsive power lift mechanism and the draft force exerted by the tractor on the implement increases gradually within the normal operating range due to a change in the consistency of the soil, the power lift mechanism automatically reduces the working depth of the implement, and thus the draft force, so that the tendency of the front wheels of the tractor to leave the ground is obviated. If, however, an excessive draft force is caused by the implement becoming jammed beneath an obstruction buried in the ground, such as a large root or rock, the working depth of the implement cannot be reduced and the reaction of the draft responsive power lift mechanism is to aggravate the tendency of the front wheels of the tractor to leave the ground, but rearing of the tractor is limited by the upper hitch link.

Considering next a semi-trailed implement, which is so connected to a tractor as to be freely pivotable relative thereto about a transverse axis, for example pivotally connected about a transverse axis to a headstock attached to a tractor three-link hitch, there is nothing to prevent the front wheels of the tractor from leaving the ground when the draft force exerted by the tractor on the implement becomes excessive for any reason. If the three-link hitch is actuated by a draft responsive power lift mechanism and the draft force increases gradually within the normal operating range due to a change in the consistency of the soil, the power lift mechanism automatically reduces the working depth of the implement, and thus the draft force, so that the tendency of the front wheels of the tractor to leave the ground is obviated. If, however, an excessive draft force is caused by the implement becoming jammed beneath an obstruction buried in the ground, the working depth of the implement cannot be reduced. Thus the action of the draft responsive power lift mechanism aggravates the tendency of the front wheels of the tractor to leave the ground, and there is nothing to prevent rearing of the tractor.

Considering now a fully trailed implement, which is so connected to a tractor as to be freely pivotable relative thereto about a transverse axis, for example hitched to a towing hook or the like on a tractor drawbar, there is nothing to prevent the front wheels of the tractor from leaving the ground when the draft force exerted by the tractor on the implement becomes excessive for any reason. In the majority of such implements, it is not possible to vary automatically the working depth of the implement relative to its frame in accordance with variations in the draft force, but where this is possible the fully trailed implement will behave in the same manner as a semi-trailed implement. Thus the tractor will rear if the implement becomes jammed beneath an obstruction buried in the ground, but will not rear due to an adverse change in the consistency in the soil causing a gradual increase in draft force within the normal operating range.

Considering finally a trailer vehicle, which is so connected to a tractor as to be freely pivotable relative thereto about a transverse axis, for example hitched to a towing hook or the like on a tractor drawbar, there is nothing to prevent the front wheels of the tractor from leaving the ground when the draft force exerted by the tractor on the trailer becomes excessive. The principle cause of an excessive draft force is overloading of the trailer, and a draft force so caused cannot be reduced by the action of a draft responsive tractor power lift mechanism.

Thus it will be seen that, except when a fully mounted implement is employed, it is possible in certain circumstances for a tractor to overturn backwards.

The object of the present invention is to provide means for preventing a tractor from overturning backwards when the draft force exerted by the tractor on a railer vehicle, a fully trailed agricultural implement or a semi-trailed agricultural implement becomes excessive.

According to the invention, a device for preventing a tractor from over-turning backwards comprises two mutually telescopic members between which there is a limited amount of movement, one of said members being adapted to be pivotally or universally connected to a trailer vehicle, to a fully trailed agricultural implement, or to a semi-trailed agricultural implement, and the other of said members being adapted to be pivotally or universally connected to the tractor at a point above or below the level at which the trailer or implement is connected to the tractor.

A preferred embodiment of the invention will now be described, by way of example only, with reference to the accompanying drawing of which:

FIG. 1 is a side elevation of a device according to the invention connected between a semi-trailed plough and a headstock which is attached to a tractor three-link hitch and to which the plough is pivotally connected about a transverse axis; and FIG. 2 is a part-sectional elevation of the device on a larger scale.

Referring now to the drawing, a semi-trailed plough indicated generally at 10 is provided with a frame 11, a ground-engaging wheel 12 adjustably mounted at the rear end of said frame, a plurality of plough bodies 13 carried by said frame, and a headstock 14 according to our co-pending application for patent No. 250,047, filed January 8, 1963, which, together with a cross-shaft 15, renders the plough operatively connectible to an upper link 16 and lower links 17 of a three-link hitch on a tractor indicated generally at 18 having a hydraulic power lift mechanism responsive automatically to variations in draft force transmitted thereto by way of the headstock 14 and the upper hitch link 16. The ground-engaging wheel 12 is carried by an arm 19 which is pivotable about a pin 20 by a hydraulic jack 21 so as to be adjustable in height relative to the plough frame 11. Thus the wheel 12 can support the rear end of the plough in either a lowered working position or a raised transport position. The hydraulic jack 21 communicates with the tractor hydraulic power lift mechanism by way of a conduit 40 and a slide valve 22 which is secured to the tractor adjacent a transverse rockshaft 23 mounted on the tractor. Said rockshaft is a conventional part of the tractor hydraulic power lift mechanism and is movable angularly about its longitudinal axis in known manner, to actuate the lower hitch links 17, by a ram movable in a hydraulic cylinder built into the tractor, said ram and cylinder (which are not shown in the drawing) also being conventional parts of the tractor hydraulic power lift mechanism. The slide valve 22 is connected by means of a connecting rod 24 to a crank 25 secured to the rockshaft 23, and the arrangement is such that during lifting of the plough into transport position the slide valve prevents any oil being delivered to the hydraulic jack 21 until the front end of the plough has almost reached its fully raised position. At this point, the angular movement of the rockshaft 23 opens the slide valve 22 whereupon lifting of the front end of the plough ceases until oil delivered to the hydraulic jack 21 has fully raised the rear end of the plough. This is because the pressure required to raise the rear end of the plough is designed to be less than that required to raise the front end thereof. Finally, the front end of the plough is moved into the fully raised position and the plough is then automatically locked hydraulically in its transport position in known manner. Similarly, when lowering the plough into its working position, its front end is lowered before its rear end since there is a smaller force available to expel oil from the hydraulic jack 21 than from the built-in cylinder of the hydraulic power lift mechanism. When the plough is in work, the height of its rear end relative to the ground is controlled solely by an adjustable stop (not shown) for the ground-engaging wheel 12, whilst the height of its front end relative to the tractor 18 is varied automatically in accordance with variations in the draft force exerted by the tractor on the plough. The plough frame 11 is connected to a trunnioned member 26 so as to be freely pivotably relative thereto about a transverse horizontal axis 27, and said trunnioned member is freely pivotable relative to the headstock 14 and the cross-shaft 15 about a vertical axis. The ground-engaging wheel 12 is automatically steerable in known manner by linkage means (not shown). A device for preventing the tractor from overturning backwards is indicated generally at 28. Said device is a strut comprising two mutually telescopic members 29 and 30 connected at one end by means of a ball joint 31 to the headstock 14 and at the other end by means of a ball joint 32 to the plough frame 11. The member 29 is tubular and surrounds part of the member 30. Said ball joints allow relative movement to take place freely between the plough frame 11 and the trunnioned member 26 and between said trunnioned member and the headstock 14. A helical compression spring 33 is provided between the members 29 and 30, said spring being disposed between two washers 34 and 35 which are slidable on the member 30. Locknuts 36 are provided on a screwed portion 37 of the member 30 to enable the washer 35 to be so positioned that an initial shortening of the strut is permitted freely before the member 29 abuts against the washer 34 and compression of the spring 33 commences. Further shortening of the strut takes place against the action of the spring 33 and is limited by said spring becoming solid.

The operation of the plough is as follows:

The free initial shortening of the strut 28 allows limited variations in attitude between the tractor and plough in normal working conditions.

Any gradual increase in the draft force within the normal operating range due, for example, to a change in the consistency of the soil, causes the draft responsive power lift mechanism to raise the front end of the plough relative to the tractor, and the strut 28 freely permits this. Thus any tendency for the front wheels of the tractor to leave the ground is obviated. If there is a sudden substantial increase in the draft force within the normal operating range due to a sudden change in the consistency of the soil, or if it is required to exert an abnormally high draft force, forward motion of the tractor and plough continues but the front wheels of the tractor are caused to leave the ground and the upper hitch link 16 pushes the headstock 14 back and compresses the spring 33. This produces a compressive force in the upper hitch link 16 which causes the transmission of a signal to the hydraulic power lift mechanism as a result of which oil under pressure is supplied automatically to the built-in cylinder to reduce the working depth of the front end of the plough, and the draft force is reduced accordingly. Furthermore, the tractor may rear to such an extent that the angular movement made by the rockshaft 23 to reduce the working depth of the fornt end of the plough is large enough to open the slide valve 22 which controls the hydraulic jack 21. If this should occur, the working depth of the rear end of the plough is also reduced and this causes an additional reduction in the draft force. A force is also transmitted mechanically from the strut 28 through the upper hitch link 16 directly to the tractor. This force, combined with the reduction in draft force, causes the front wheels of the tractor to fall back on to the ground. If the draft force exerted by the tractor on the plough suddenly becomes excessive due, for example, to one of the plough bodies 13 becoming jammed beneath an obstruction buried in the ground, forward motion of the tractor and plough is arrested and the turning moment acting on the tractor and the reaction of the draft responsive power lift mechanism both cause the front wheels of the tractor to leave the ground. The upper hitch link 16 pushes the headstock 14 back and causes the strut 28 to shorten until the spring 33 becomes solid. Thus rearing of the tractor is limited by the mechanical action of the strut 28, and the tractor is effectively prevented from overturning backwards. This is the prime function of the strut and it will be realised that the strut would operate in this manner even if the tractor were not provided with a draft responsive power lift mechanism.

Various modification are possible within the scope of the appendant claims. For example, the helical compression spring can be replaced by variable rate resilient means confined between the mutually telescopic members. Said means can comprise a chamber containing oil and air separated by a piston or diaphragm. In another modification, the device for preventing the tractor from overturning backwards is a tie comprising two mutually telescopic members between which there is connected a helical tension spring or the like, one of said members being connectible to the trailer or implement and the other of said members being connectible to the tractor at a point below or above the level at which the trailer or implement is connected to the tractor.

What I claim is:

1. A device adapted to be interposed between a tractor and an agricultural implement which has at least one wheel in contact with the ground and has a draft connection with said tractor and is effective for preventing the tractor from overturning backwards when the draft force becomes excessive, said device comprising two telescopic members connected at adjacent ends for limited relative sliding movement in the direction for shortening said device but being capable of substantially free relative sliding to elongate the device, said connection permitting said limited relative sliding movement in the direction for shortening said device comprising means permitting an initial free movement in said direction and resilient means resisting further movement in said direction, means at the other end of one of said members for universally pivotally connecting it to said implement, and means at the other end of the other of said members for universally pivotally connecting it to said tractor at a location vertically above said draft connection.

2. A device according to claim 1, wherein means are provided for adjusting the amount of said free movement.

3. A device adapted to be interposed between a tractor and an agricultural implement which has at least one wheel in contact with the ground and has a draft connection with said tractor and is effective for preventing the tractor from overturning backwards when the draft force becomes excessive, said device comprising two telescopic members connected at adjacent ends for relative sliding movement, means comprising a spring interposed between said members of permitting a limited amount of initial free movement in the direction to shorten said device and then resiliently resisting further movement in said direction until the spring is compressed, said members being capable of substantially free relative sliding to elongate the device, means at the other end of one of said members for universally pivotally connecting it to said implement, and means at the other end of the other of said members for universally pivotally connecting it to said tractor at a location vertically above said draft connection.

4. A device adapted to be interposed between a tractor and an agricultural implement which has at least one wheel in contact with the ground and has a draft connection with said tractor and is effective for preventing the tractor from overturning backwards when the draft force becomes excessive, said draft connection comprising a tractor three-link hitch to which is attached a headstock with said implement being pivotally connected on a transverse axis to said headstock, said device comprising two telescopic members connected at adjacent ends for limited initial free relative sliding movement in the direction for shortening said device, means resiliently resisting further relative movement of said members in said direction, said members being capable of substantially free relative sliding to elongate the device, means at the other end of one of said members for universally pivotally connecting it to said implement, and means at the other end of the other of said members for universally pivotally connecting it to said headstock at a location vertically above said draft connection.

References Cited by the Examiner

UNITED STATES PATENTS

| | | | |
|---|---|---|---|
| 2,551,870 | 5/1951 | Bridger | 280—489 X |
| 2,633,367 | 3/1953 | Annis | 280—150 |
| 2,697,903 | 12/1954 | McKay | 172—449 X |
| 2,704,018 | 3/1955 | Oehler et al. | 172—449 |
| 2,805,083 | 9/1957 | Sherwen | 280—479 |
| 2,906,354 | 9/1959 | Schwegler | 172—449 |
| 2,919,754 | 1/1960 | Walberg | 172—7 |

FOREIGN PATENTS

| | | |
|---|---|---|
| 1,231,188 | 4/1960 | France. |

BENJAMIN HERSH, *Primary Examiner.*

LEO FRIAGLIA, A. HARRY LEAVY, *Examiners.*